US008512568B2

(12) United States Patent
Zha et al.

(10) Patent No.: US 8,512,568 B2
(45) Date of Patent: Aug. 20, 2013

(54) METHOD OF CLEANING MEMBRANE MODULES (75) Inventors: Fufang Zha, West Ryde (AU); Anthony James Stubbs, Ryde (AU)

(73) Assignee: Siemens Industry, Inc., Alpharetta, GA (US)

( * ) Notice: Subject to any disclaimer, the term of this patent is extended or adjusted under 35 U.S.C. 154(b) by 202 days.

(21) Appl. No.: 12/466,199

(22) Filed: May 14, 2009

(65) Prior Publication Data
US 2009/0223895 A1    Sep. 10, 2009

Related U.S. Application Data (63) Continuation of application No. 10/774,041, filed on Feb. 6, 2004, now abandoned, which is a continuation of application No. PCT/AU02/01065, filed on Aug. 8, 2002.

(30) Foreign Application Priority Data

Aug. 9, 2001 (AU) ..................... PR6924

(51) Int. Cl.
B01D 61/22    (2006.01)
B01D 65/02    (2006.01)
B01D 65/08    (2006.01)
B01D 63/04    (2006.01)

(52) U.S. Cl.
USPC ........... 210/650; 210/636; 210/785; 210/106; 210/321.69; 210/393; 210/411; 210/108; 210/333.01

(58) Field of Classification Search
None
See application file for complete search history.

(56) References Cited

U.S. PATENT DOCUMENTS

| 256,008 A | 4/1882 | Leak |
| 285,321 A | 9/1883 | Tams |
| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |

(Continued)

FOREIGN PATENT DOCUMENTS

| AU | 34400/84 A | 4/1985 |
| AU | 55847/86 A | 9/1986 |

(Continued)

OTHER PUBLICATIONS

"Chemical Cleaning Definition", Lenntech BV, Lenntech Water treatment & purification Holding B.V., Chemical Cleaning.

(Continued)

*Primary Examiner* — Krishnan S Menon (57) ABSTRACT

A method of cleaning a membrane filtration module (6), the module (6) including at least one membrane (8) located in a feed-containing vessel (7), the membrane (8) having a permeable wall which is subjected to a filtration operation wherein feed containing contaminant matter is applied to one side of the membrane wall and filtrate is withdrawn from the other side of the membrane wall. The method comprising the steps of: suspending the filtration operation; performing a cleaning process on the membrane wall to dislodge contaminant matter therefrom into liquid surrounding the membrane (8); performing a high velocity sweep of the feed-containing vessel (7) to remove the liquid containing the dislodged contaminant matter; and recommencing the filtration operation. An improved gas scouring method is also disclosed.

14 Claims, 4 Drawing Sheets

(56) References Cited

U.S. PATENT DOCUMENTS

| | | |
|---|---|---|
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Shorr |
| 3,563,860 A | 2/1971 | Henderyckx |
| 3,591,010 A | 7/1971 | Pall et al. |
| 3,625,827 A | 12/1971 | Wildi et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,982,095 A | 9/1976 | Robinson |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,183,890 A | 1/1980 | Bollinger |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,919,815 A | 4/1990 | Copa et al. |

| Patent | Date | Inventor |
|---|---|---|
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,969,997 A | 11/1990 | Kluver et al. |
| 4,980,066 A | 12/1990 | Slegers |
| 4,988,444 A | 1/1991 | Applegate et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,076,925 A | 12/1991 | Roesink et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H0001045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A | 3/1997 | Cote et al. |
| 5,626,755 A | 5/1997 | Keyser et al. |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,024,872 A | 2/2000 | Mahendran et al. |
| 6,036,030 A | 3/2000 | Stone et al. |
| 6,039,872 A | 3/2000 | Wu et al. |

| | | | |
|---|---|---|---|
| 6,042,677 A | 3/2000 | Mahendran et al. | |
| 6,045,698 A | 4/2000 | Cote et al. | |
| 6,045,899 A | 4/2000 | Wang et al. | |
| 6,048,454 A | 4/2000 | Jenkins | |
| 6,048,455 A | 4/2000 | Janik | |
| 6,066,401 A | 5/2000 | Stilburn | |
| 6,071,404 A | 6/2000 | Tsui | |
| 6,074,718 A | 6/2000 | Puglia et al. | |
| 6,077,435 A | 6/2000 | Beck et al. | |
| 6,083,393 A | 7/2000 | Wu et al. | |
| 6,096,213 A | 8/2000 | Radovanovic et al. | |
| 6,113,782 A | 9/2000 | Leonard | |
| 6,120,688 A | 9/2000 | Daly et al. | |
| 6,126,819 A | 10/2000 | Heine et al. | |
| 6,146,747 A | 11/2000 | Wang et al. | |
| 6,149,817 A | 11/2000 | Peterson et al. | |
| 6,156,200 A | 12/2000 | Zha et al. | |
| 6,159,373 A | 12/2000 | Beck et al. | |
| 6,162,020 A | 12/2000 | Kondo | |
| 6,193,890 B1 | 2/2001 | Pedersen et al. | |
| 6,202,475 B1 | 3/2001 | Selbie et al. | |
| 6,214,231 B1 | 4/2001 | Cote et al. | |
| 6,214,232 B1 | 4/2001 | Baurmeister et al. | |
| 6,221,247 B1 | 4/2001 | Nemser et al. | |
| 6,245,239 B1 | 6/2001 | Cote et al. | |
| 6,254,773 B1 | 7/2001 | Biltoft | |
| 6,264,839 B1 | 7/2001 | Mohr et al. | |
| 6,277,512 B1 | 8/2001 | Hamrock et al. | |
| 6,280,626 B1 | 8/2001 | Miyashita et al. | |
| 6,284,135 B1 | 9/2001 | Ookata | |
| 6,290,756 B1 | 9/2001 | Macheras et al. | |
| 6,294,039 B1 | 9/2001 | Mahendran et al. | |
| 6,299,773 B1 | 10/2001 | Takamura et al. | |
| 6,303,026 B1 | 10/2001 | Lindbo | |
| 6,303,035 B1 | 10/2001 | Cote et al. | |
| 6,315,895 B1 | 11/2001 | Summerton et al. | |
| 6,319,411 B1 | 11/2001 | Cote | |
| 6,322,703 B1 | 11/2001 | Taniguchi et al. | |
| 6,324,898 B1 | 12/2001 | Cote et al. | |
| 6,325,928 B1 | 12/2001 | Pedersen et al. | |
| 6,325,938 B1 | 12/2001 | Miyashita et al. | |
| 6,331,248 B1 | 12/2001 | Taniguchi et al. | |
| 6,337,018 B1 | 1/2002 | Mickols | |
| RE37,549 E | 2/2002 | Mahendran et al. | |
| 6,349,835 B1 | 2/2002 | Saux et al. | |
| 6,354,444 B1 | 3/2002 | Mahendran et al. | |
| 6,361,695 B1 | 3/2002 | Husain et al. | |
| 6,368,819 B1 | 4/2002 | Gaddy et al. | |
| 6,372,138 B1 | 4/2002 | Cho et al. | |
| 6,375,848 B1 | 4/2002 | Cote et al. | |
| 6,383,369 B2 | 5/2002 | Elston | |
| 6,387,189 B1 | 5/2002 | Groschl et al. | |
| 6,402,955 B2 | 6/2002 | Ookata | |
| 6,406,629 B1 | 6/2002 | Husain et al. | |
| 6,423,214 B1 | 7/2002 | Lindbo | |
| 6,423,784 B1 | 7/2002 | Hamrock et al. | |
| 6,432,310 B1 | 8/2002 | Andou et al. | |
| 6,440,303 B2 | 8/2002 | Spriegel | |
| D462,699 S | 9/2002 | Johnson et al. | |
| 6,444,124 B1 | 9/2002 | Onyeche et al. | |
| 6,468,430 B1 | 10/2002 | Kimura et al. | |
| 6,471,869 B1 | 10/2002 | Yanou et al. | |
| 6,485,645 B1 | 11/2002 | Husain et al. | |
| 6,495,041 B2 | 12/2002 | Taniguchi et al. | |
| 6,517,723 B1 | 2/2003 | Daigger et al. | |
| 6,524,481 B2 | 2/2003 | Zha et al. | |
| 6,524,733 B2 | 2/2003 | Nonobe | |
| 6,550,747 B2 | 4/2003 | Rabie et al. | |
| 6,555,005 B1 | 4/2003 | Zha et al. | |
| 6,562,237 B1 | 5/2003 | Olaopa | |
| 6,576,136 B1 | 6/2003 | De Moel et al. | |
| 6,592,762 B2 | 7/2003 | Smith | |
| D478,913 S | 8/2003 | Johnson et al. | |
| 6,613,222 B2 | 9/2003 | Mikkelson et al. | |
| 6,620,319 B2 | 9/2003 | Behmann et al. | |
| 6,623,643 B2 | 9/2003 | Chisholm et al. | |
| 6,627,082 B2 | 9/2003 | Del Vecchio et al. | |
| 6,632,358 B1 | 10/2003 | Suga et al. | |
| 6,635,179 B1 | 10/2003 | Summerton et al. | |
| 6,641,733 B2 | 11/2003 | Zha et al. | |
| 6,645,374 B2 | 11/2003 | Cote et al. | |
| 6,656,356 B2 | 12/2003 | Gungerich et al. | |
| 6,682,652 B2 | 1/2004 | Mahendran et al. | |
| 6,685,832 B2 | 2/2004 | Mahendran et al. | |
| 6,696,465 B2 | 2/2004 | Dellaria et al. | |
| 6,702,561 B2 | 3/2004 | Stillig et al. | |
| 6,706,185 B2 | 3/2004 | Goel et al. | |
| 6,706,189 B2 | 3/2004 | Rabie et al. | |
| 6,708,957 B2 | 3/2004 | Guibert et al. | |
| 6,712,970 B1 | 3/2004 | Trivedi | |
| 6,721,529 B2 | 4/2004 | Chen et al. | |
| 6,723,242 B1 | 4/2004 | Ohkata et al. | |
| 6,723,758 B2 | 4/2004 | Stone et al. | |
| 6,727,305 B1 | 4/2004 | Pavez Aranguiz | |
| 6,743,362 B1 | 6/2004 | Porteous et al. | |
| 6,755,970 B1 | 6/2004 | Knappe et al. | |
| 6,758,972 B2 | 7/2004 | Vriens et al. | |
| 6,761,826 B2 | 7/2004 | Bender | |
| 6,770,202 B1 | 8/2004 | Kidd et al. | |
| 6,780,466 B2 | 8/2004 | Grangeon et al. | |
| 6,783,008 B2 | 8/2004 | Zha et al. | |
| 6,790,347 B2 | 9/2004 | Jeong et al. | |
| 6,790,912 B2 | 9/2004 | Blong | |
| 6,805,806 B2 | 10/2004 | Arnaud | |
| 6,808,629 B2 | 10/2004 | Wouters-Wasiak et al. | |
| 6,811,696 B2 | 11/2004 | Wang et al. | |
| 6,814,861 B2 | 11/2004 | Husain et al. | |
| 6,821,420 B2 | 11/2004 | Zha et al. | |
| 6,830,782 B2 | 12/2004 | Kanazawa | |
| 6,840,251 B2 | 1/2005 | Gill et al. | |
| 6,841,070 B2 | 1/2005 | Zha et al. | |
| 6,861,466 B2 | 3/2005 | Dadalas et al. | |
| 6,863,816 B2 | 3/2005 | Austin et al. | |
| 6,863,817 B2 | 3/2005 | Liu et al. | |
| 6,863,818 B2 | 3/2005 | Daigger et al. | |
| 6,863,823 B2 | 3/2005 | Cote | |
| 6,869,534 B2 | 3/2005 | McDowell et al. | |
| 6,872,305 B2 | 3/2005 | Johnson et al. | |
| 6,881,343 B2 | 4/2005 | Rabie et al. | |
| 6,884,350 B2 | 4/2005 | Muller | |
| 6,884,375 B2 | 4/2005 | Wang et al. | |
| 6,890,435 B2 | 5/2005 | Ji et al. | |
| 6,890,645 B2 | 5/2005 | Disse et al. | |
| 6,893,568 B1 | 5/2005 | Janson et al. | |
| 6,899,812 B2 | 5/2005 | Cote et al. | |
| 6,936,085 B2 | 8/2005 | DeMarco | |
| 6,946,073 B2 | 9/2005 | Daigger et al. | |
| 6,952,258 B2 | 10/2005 | Ebert et al. | |
| 6,955,762 B2 | 10/2005 | Gallagher et al. | |
| 6,962,258 B2 | 11/2005 | Zha et al. | |
| 6,964,741 B2 | 11/2005 | Mahendran et al. | |
| 6,969,465 B2 | 11/2005 | Zha et al. | |
| 6,974,554 B2 | 12/2005 | Cox et al. | |
| 6,994,867 B1 | 2/2006 | Hossainy et al. | |
| 7,005,100 B2 | 2/2006 | Lowell | |
| 7,014,763 B2 | 3/2006 | Johnson et al. | |
| 7,018,530 B2 | 3/2006 | Pollock | |
| 7,018,533 B2 | 3/2006 | Johnson et al. | |
| 7,022,233 B2 | 4/2006 | Chen | |
| 7,041,728 B2 | 5/2006 | Zipplies et al. | |
| 7,052,610 B2 | 5/2006 | Janson et al. | |
| 7,083,733 B2 | 8/2006 | Freydina et al. | |
| 7,087,173 B2 | 8/2006 | Cote et al. | |
| 7,122,121 B1 | 10/2006 | Ji | |
| 7,147,777 B1 | 12/2006 | Porteous | |
| 7,147,778 B1 | 12/2006 | DiMassimo et al. | |
| 7,160,455 B2 | 1/2007 | Taniguchi et al. | |
| 7,160,463 B2 | 1/2007 | Beck et al. | |
| 7,160,464 B2 | 1/2007 | Lee et al. | |
| 7,172,699 B1 | 2/2007 | Trivedi et al. | |
| 7,172,701 B2 | 2/2007 | Gaid et al. | |
| 7,186,344 B2 | 3/2007 | Hughes | |
| 7,208,091 B2 | 4/2007 | Pind et al. | |
| 7,223,340 B2 | 5/2007 | Zha et al. | |
| 7,226,541 B2 | 6/2007 | Muller et al. | |
| 7,247,238 B2 | 7/2007 | Mullette et al. | |
| 7,264,716 B2 | 9/2007 | Johnson et al. | |
| 7,279,100 B2 | 10/2007 | Devine | |

| | | |
|---|---|---|
| 7,279,215 B2 | 10/2007 | Hester et al. |
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 | 5/2009 | Murkute et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1 | 12/2001 | Cote et al. |
| 2002/0027111 A1 | 3/2002 | Ando et al. |
| 2002/0070157 A1 | 6/2002 | Yamada |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0075495 A1 | 4/2003 | Dannstrom et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0178365 A1 | 9/2003 | Zha et al. |
| 2003/0196955 A1 | 10/2003 | Hughes |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178154 A1 | 9/2004 | Zha et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0065596 A1 | 3/2006 | Kent et al. |
| 2006/0081533 A1 | 4/2006 | Khudenko |
| 2006/0131234 A1 | 6/2006 | Zha et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007207 A1 | 1/2007 | Mahendran et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0023913 A1 | 2/2011 | Fulling |
| 2011/0049047 A1 | 3/2011 | Cumin et al. |
| 2011/0056522 A1 | 3/2011 | Zauner et al. |
| 2011/0100907 A1 | 5/2011 | Zha et al. |
| 2011/0114557 A2 | 5/2011 | Johnson et al. |
| 2011/0127209 A1 | 6/2011 | Rogers et al. |
| 2011/0132826 A1 | 6/2011 | Muller et al. |

| Publication No. | Date | Name |
|---|---|---|
| 2011/0139715 A1 | 6/2011 | Zha et al. |
| 2011/0192783 A1 | 8/2011 | Cox et al. |
| 2011/0198283 A1 | 8/2011 | Zha et al. |
| 2012/0091602 A1 | 4/2012 | Cumin et al. |

FOREIGN PATENT DOCUMENTS

| | | |
|---|---|---|
| AU | 77066/87 A | 2/1988 |
| AU | 762091 B2 | 6/2003 |
| AU | 2004289373 A1 | 5/2005 |
| CA | 2460207 A1 | 3/2003 |
| CA | 2531764 A1 | 3/2005 |
| CN | 86104888 A | 2/1988 |
| CN | 1050770 | 1/1995 |
| CN | 2204898 Y | 8/1995 |
| CN | 2204898Y Y | 8/1995 |
| CN | 2236049 Y | 9/1996 |
| CN | 2236049Y Y | 9/1996 |
| CN | 1159769 | 9/1997 |
| CN | 1159769 A | 9/1997 |
| CN | 1244814 A | 2/2000 |
| CN | 1249698 A | 4/2000 |
| CN | 1265636 A | 9/2000 |
| CN | 1319032 A | 10/2001 |
| CN | 1468140 A | 1/2004 |
| CN | 1541757 A | 11/2004 |
| DE | 3904544 A | 8/1990 |
| DE | 4117281 A | 1/1992 |
| DE | 4113420 A1 | 10/1992 |
| DE | 4117422 A | 11/1992 |
| DE | 4326603 A1 | 2/1995 |
| DE | 19503060 A1 | 8/1996 |
| DE | 29804927 U1 | 6/1998 |
| DE | 29906389 U1 | 6/1999 |
| DE | 10045227 C1 | 2/2002 |
| DE | 10209170 C1 | 8/2003 |
| DE | 202004012693 U1 | 10/2004 |
| EP | 012557 B1 | 2/1983 |
| EP | 126714 A2 | 11/1984 |
| EP | 50447 A | 10/1985 |
| EP | 194735 A2 | 9/1986 |
| EP | 250337 A1 | 12/1987 |
| EP | 327025 A | 8/1989 |
| EP | 344633 A1 | 12/1989 |
| EP | 090383 B1 | 5/1990 |
| EP | 1052012 A1 | 11/1990 |
| EP | 407900 A2 | 1/1991 |
| EP | 463627 A | 1/1992 |
| EP | 0464321 A1 | 1/1992 |
| EP | 492942 A2 | 7/1992 |
| EP | 518250 B1 | 12/1992 |
| EP | 547575 A1 | 6/1993 |
| EP | 280052 B1 | 7/1994 |
| EP | 395133 A1 | 2/1995 |
| EP | 662341 A1 | 7/1995 |
| EP | 492446 B1 | 11/1995 |
| EP | 430082 A2 | 6/1996 |
| EP | 734758 A1 | 10/1996 |
| EP | 763758 A1 | 10/1996 |
| EP | 824956 A2 | 2/1998 |
| EP | 848194 A2 | 6/1998 |
| EP | 855214 A1 | 7/1998 |
| EP | 627255 B1 | 1/1999 |
| EP | 911073 A1 | 4/1999 |
| EP | 920904 A1 | 6/1999 |
| EP | 0937494 A2 | 8/1999 |
| EP | 1034835 | 9/2000 |
| EP | 1156015 A1 | 11/2001 |
| EP | 1300186 A1 | 4/2003 |
| EP | 1349644 B1 | 10/2003 |
| EP | 1350555 A1 | 10/2003 |
| EP | 1236503 B1 | 8/2004 |
| EP | 1445240 | 8/2004 |
| EP | 1466658 A1 | 10/2004 |
| EP | 1659171 A1 | 5/2006 |
| EP | 1420874 B1 | 1/2011 |
| FR | 2620712 A1 | 3/1989 |
| FR | 2674448 A1 | 2/1992 |
| FR | 2699424 A1 | 6/1994 |
| FR | 2762834 A1 | 11/1998 |
| GB | 702911 A | 1/1954 |
| GB | 996195 A | 6/1965 |
| GB | 2253572 A | 9/1992 |
| JP | 52-078677 A | 7/1977 |
| JP | 53108882 A | 9/1978 |
| JP | 54162684 A | 12/1979 |
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58-088007 A2 | 5/1983 |
| JP | 60019002 A | 1/1985 |
| JP | 60-206412 A | 10/1985 |
| JP | 60260628 A | 12/1985 |
| JP | 61-097006 A2 | 5/1986 |
| JP | 61-107905 A2 | 5/1986 |
| JP | 61097005 A | 5/1986 |
| JP | 61167406 A | 7/1986 |
| JP | 61167407 A | 7/1986 |
| JP | S63-38884 | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61-257203 A2 | 11/1986 |
| JP | 61-263605 A2 | 11/1986 |
| JP | 61249505 A | 11/1986 |
| JP | 61291007 A | 12/1986 |
| JP | 61293504 A | 12/1986 |
| JP | 62-004408 A2 | 1/1987 |
| JP | 62-114609 A2 | 5/1987 |
| JP | 62-140607 A2 | 6/1987 |
| JP | 62144708 A | 6/1987 |
| JP | 62163708 | 7/1987 |
| JP | 62-179540 A2 | 8/1987 |
| JP | 62-250908 | 10/1987 |
| JP | 62250908 A | 10/1987 |
| JP | 62262710 A | 11/1987 |
| JP | 63-93307 | 4/1988 |
| JP | 63-097634 A2 | 4/1988 |
| JP | 63099246 A | 4/1988 |
| JP | 63-143905 A2 | 6/1988 |
| JP | 63-1602 | 7/1988 |
| JP | 63171607 A | 7/1988 |
| JP | 63180254 A | 7/1988 |
| JP | 64-075542 A | 3/1989 |
| JP | 1-501046 T | 4/1989 |
| JP | 1111494 A | 4/1989 |
| JP | 01151906 A | 6/1989 |
| JP | 01-307409 A2 | 12/1989 |
| JP | 02-017925 | 1/1990 |
| JP | 02017924 | 1/1990 |
| JP | 02026625 A | 1/1990 |
| JP | 02031200 A | 2/1990 |
| JP | 02040296 A | 2/1990 |
| JP | 02107318 A | 4/1990 |
| JP | 02126922 A | 5/1990 |
| JP | 02-144132 A2 | 6/1990 |
| JP | 02-164423 A2 | 6/1990 |
| JP | 02174918 A | 7/1990 |
| JP | 02241523 A | 9/1990 |
| JP | 02-284035 A2 | 11/1990 |
| JP | 02277528 A | 11/1990 |
| JP | 03-018373 A | 1/1991 |
| JP | 03-028797 A2 | 2/1991 |
| JP | 03-086529 A | 4/1991 |
| JP | 03-110445 A2 | 5/1991 |
| JP | 04108518 A | 4/1992 |
| JP | 04110023 A | 4/1992 |
| JP | 4-190889 A | 7/1992 |
| JP | 04187224 A | 7/1992 |
| JP | 04-250898 | 9/1992 |
| JP | 4-256425 A | 9/1992 |
| JP | 04-265128 | 9/1992 |
| JP | 04256424 A | 9/1992 |
| JP | 04293527 A | 10/1992 |

| | | | | | | |
|---|---|---|---|---|---|---|
| JP | 04-310223 | A2 | 11/1992 | JP | 10-156149 A2 | 6/1998 |
| JP | 04317793 | A | 11/1992 | JP | 10180048 A | 7/1998 |
| JP | 04334530 | A | 11/1992 | JP | 10225685 A | 8/1998 |
| JP | 04348252 | A | 12/1992 | JP | 10235168 A | 9/1998 |
| JP | 05-023557 | A2 | 2/1993 | JP | 10249171 A | 9/1998 |
| JP | 05-096136 | | 4/1993 | JP | 10286441 A | 10/1998 |
| JP | 05-157654 | A2 | 6/1993 | JP | 10328538 A | 12/1998 |
| JP | 05137977 | A | 6/1993 | JP | 11005023 A | 1/1999 |
| JP | 05161831 | A | 6/1993 | JP | 11028339 A | 2/1999 |
| JP | 05184884 | A | 7/1993 | JP | 11028467 A | 2/1999 |
| JP | 05279447 | A | 10/1993 | JP | 11031025 A | 2/1999 |
| JP | 05-285348 | | 11/1993 | JP | 11033365 A | 2/1999 |
| JP | 05305221 | A | 11/1993 | JP | 11033367 A | 2/1999 |
| JP | 06-027215 | A | 2/1994 | JP | 11076769 A | 3/1999 |
| JP | 06-071120 | A2 | 3/1994 | JP | 11076770 A | 3/1999 |
| JP | 06-114240 | A2 | 4/1994 | JP | 11090189 A | 4/1999 |
| JP | 06170364 | A | 6/1994 | JP | 11-165200 | 6/1999 |
| JP | 06190250 | A | 7/1994 | JP | 11156166 A | 6/1999 |
| JP | 06-218237 | | 8/1994 | JP | 11156360 A | 6/1999 |
| JP | 06238273 | A | 8/1994 | JP | 11-179171 A | 7/1999 |
| JP | 06-277469 | A | 10/1994 | JP | 11-309351 A | 11/1999 |
| JP | 06-285496 | | 10/1994 | JP | 11-319507 A | 11/1999 |
| JP | 06-292820 | A | 10/1994 | JP | 11300177 A | 11/1999 |
| JP | 06-343837 | | 12/1994 | JP | 11302438 A | 11/1999 |
| JP | 07-000770 | A2 | 1/1995 | JP | 11319501 A | 11/1999 |
| JP | 07-024272 | | 1/1995 | JP | 11333265 A | 12/1999 |
| JP | 07047247 | A | 2/1995 | JP | 2000000439 A | 1/2000 |
| JP | 07068139 | A | 3/1995 | JP | 200051670 | 2/2000 |
| JP | 07136470 | A | 5/1995 | JP | 2000051669 A | 2/2000 |
| JP | 07136471 | A | 5/1995 | JP | 2000061466 A | 2/2000 |
| JP | 07-155758 | | 6/1995 | JP | 200079390 | 3/2000 |
| JP | 07155564 | A | 6/1995 | JP | 2000070684 A | 3/2000 |
| JP | 7-39921 | | 7/1995 | JP | 2000-093758 | 4/2000 |
| JP | 07-185268 | | 7/1995 | JP | 2000-157845 | 6/2000 |
| JP | 07-185271 | | 7/1995 | JP | 2000157850 | 6/2000 |
| JP | 07178323 | A | 7/1995 | JP | 2000185220 A | 7/2000 |
| JP | 07185270 | A | 7/1995 | JP | 2000189958 A | 7/2000 |
| JP | 07185272 | A | 7/1995 | JP | 2000233020 A | 8/2000 |
| JP | 07204635 | A | 8/1995 | JP | 2000237548 A | 9/2000 |
| JP | 07236819 | A | 9/1995 | JP | 2000300968 A | 10/2000 |
| JP | 07-256253 | | 10/1995 | JP | 2000317276 A | 11/2000 |
| JP | 07-275665 | A2 | 10/1995 | JP | 2000-334276 A | 12/2000 |
| JP | 07251043 | A | 10/1995 | JP | 2000342932 A | 12/2000 |
| JP | 07289860 | A | 11/1995 | JP | 2001009246 A | 1/2001 |
| JP | 07303895 | A | 11/1995 | JP | 2001070967 A | 3/2001 |
| JP | 07313973 | A | 12/1995 | JP | 2001079366 A | 3/2001 |
| JP | 08-010585 | A2 | 1/1996 | JP | 2001079367 A | 3/2001 |
| JP | 8039089 | A | 2/1996 | JP | 2001104760 A | 4/2001 |
| JP | 08-197053 | A | 8/1996 | JP | 2001120963 A | 5/2001 |
| JP | 08323161 | A | 12/1996 | JP | 2001-510396 T | 7/2001 |
| JP | 08332357 | A | 12/1996 | JP | 2001179059 A | 7/2001 |
| JP | 09000890 | A | 1/1997 | JP | 2001179060 A | 7/2001 |
| JP | 09038470 | A | 2/1997 | JP | 2001190937 A | 7/2001 |
| JP | 09038648 | A | 2/1997 | JP | 2001190938 A | 7/2001 |
| JP | 09-075689 | A | 3/1997 | JP | 2001205055 A | 7/2001 |
| JP | 09072993 | A | 3/1997 | JP | 2001232160 A | 8/2001 |
| JP | 09099227 | A | 4/1997 | JP | 2001-269546 | 10/2001 |
| JP | 09103655 | A | 4/1997 | JP | 2002011472 | 1/2002 |
| JP | 9103661 | A | 4/1997 | JP | 2002143849 A | 5/2002 |
| JP | 9117647 | A | 5/1997 | JP | 2002177746 A | 6/2002 |
| JP | 9138298 | A | 5/1997 | JP | 3302992 B2 | 7/2002 |
| JP | 09-141063 | A2 | 6/1997 | JP | 2002-527229 | 8/2002 |
| JP | 09155345 | A | 6/1997 | JP | 2002525197 T | 8/2002 |
| JP | 09187628 | A | 7/1997 | JP | 2002263407 A | 9/2002 |
| JP | 09192458 | A | 7/1997 | JP | 2002-336663 | 11/2002 |
| JP | 09-220569 | | 8/1997 | JP | 2003024751 | 1/2003 |
| JP | 09271641 | A | 10/1997 | JP | 2003047830 A | 2/2003 |
| JP | 09-313902 | A | 12/1997 | JP | 2003053157 A | 2/2003 |
| JP | 09324067 | A | 12/1997 | JP | 2003053160 A | 2/2003 |
| JP | 10-015365 | A | 1/1998 | JP | 200371254 A | 3/2003 |
| JP | 10024222 | A | 1/1998 | JP | 2003062436 A | 3/2003 |
| JP | 10033955 | A | 2/1998 | JP | 2003135935 A | 5/2003 |
| JP | 10048466 | A | 2/1998 | JP | 2003190976 A | 7/2003 |
| JP | 10066972 | A | 3/1998 | JP | 2003-265597 | 9/2003 |
| JP | 10076144 | A | 3/1998 | JP | 2003-275548 A | 9/2003 |
| JP | 10076264 | A | 3/1998 | JP | 2003266072 A | 9/2003 |
| JP | 10085562 | A | 4/1998 | JP | 2003275759 A | 9/2003 |
| JP | 10085565 | A | 4/1998 | JP | 2003340250 A | 12/2003 |
| JP | 10085566 | A | 4/1998 | JP | 2004-008981 | 1/2004 |

| | | | |
|---|---|---|---|
| JP | 2004073950 A | 3/2004 | |
| JP | 2004-230287 A | 8/2004 | |
| JP | 2004216263 A | 8/2004 | |
| JP | 2004230280 A | 8/2004 | |
| JP | 2004249168 A | 9/2004 | |
| JP | 2004322100 A | 11/2004 | |
| JP | 2004-536710 A | 12/2004 | |
| JP | 2004337730 A | 12/2004 | |
| JP | 2005-502467 A | 1/2005 | |
| JP | 2005-087887 A | 4/2005 | |
| JP | 2005144291 A | 6/2005 | |
| JP | 2005154551 A | 6/2005 | |
| JP | 2005279447 A | 10/2005 | |
| JP | 2006-116495 | 5/2006 | |
| JP | 2007-547083 | 8/2010 | |
| JP | 4833353 B2 | 12/2011 | |
| KR | 20-0232145 | 7/2001 | |
| KR | 1020020067227 | 8/2002 | |
| KR | 20-0295350 | 11/2002 | |
| KR | 2002-0090967 | 12/2002 | |
| KR | 2003-033812 | 5/2003 | |
| KR | 2003-060625 | 7/2003 | |
| NL | 1006390 C2 | 12/1998 | |
| NL | 1020491 | 10/2003 | |
| NL | 1021197 | 10/2003 | |
| NO | 20053769 A | 2/2006 | |
| NZ | 510394 A | 5/2003 | |
| NZ | 537874 A | 2/2007 | |
| TW | 347343 | 12/1998 | |
| WO | 8501449 A1 | 4/1985 | |
| WO | 8605116 A1 | 9/1986 | |
| WO | 8605705 A1 | 10/1986 | |
| WO | 8800494 A1 | 1/1988 | |
| WO | 8801529 A1 | 3/1988 | |
| WO | 8801895 A1 | 3/1988 | |
| WO | 8806200 A1 | 8/1988 | |
| WO | 8900880 A1 | 2/1989 | |
| WO | 90/00434 | 1/1990 | |
| WO | WO 90/00434 | 1/1990 | |
| WO | 9104783 A1 | 4/1991 | |
| WO | 9116124 A1 | 10/1991 | |
| WO | 93/02779 A1 | 2/1993 | |
| WO | 9302779 A1 | 2/1993 | |
| WO | WO 93/02779 A1 | 2/1993 | |
| WO | 93/15827 | 8/1993 | |
| WO | WO 93/15827 | 8/1993 | |
| WO | 9323152 A1 | 11/1993 | |
| WO | 9411094 A1 | 5/1994 | |
| WO | 9511736 A1 | 5/1995 | |
| WO | 9534424 A1 | 12/1995 | |
| WO | 9603202 A1 | 2/1996 | |
| WO | 9607470 A1 | 3/1996 | |
| WO | 9628236 A1 | 9/1996 | |
| WO | 9629142 A1 | 9/1996 | |
| WO | 96/41676 | 12/1996 | |
| WO | WO 96/41676 | 12/1996 | |
| WO | 9706880 A2 | 2/1997 | |
| WO | 9822204 A1 | 5/1998 | |
| WO | 9825694 A1 | 6/1998 | |
| WO | 9828066 A1 | 7/1998 | |
| WO | 9853902 A1 | 12/1998 | |
| WO | 99/01207 | 1/1999 | |
| WO | WO 99/01207 | 1/1999 | |
| WO | 99-55448 A1 | 11/1999 | |
| WO | 99/59707 | 11/1999 | |
| WO | WO 99/59707 | 11/1999 | |
| WO | 0018498 A1 | 4/2000 | |
| WO | WO 0030742 A1 | 6/2000 | |
| WO | 0100307 A2 | 1/2001 | |
| WO | 0105715 A1 | 1/2001 | |
| WO | 0108790 A1 | 2/2001 | |
| WO | 0119414 A1 | 3/2001 | |
| WO | 0132299 A1 | 5/2001 | |
| WO | 0136075 | 5/2001 | |
| WO | WO 0136075 | 5/2001 | |
| WO | 0143856 A1 | 6/2001 | |
| WO | 0145829 A1 | 6/2001 | |
| WO | 0226363 A2 | 4/2002 | |
| WO | 0230550 A1 | 4/2002 | |
| WO | 0240140 A1 | 5/2002 | |
| WO | 0247800 A1 | 6/2002 | |
| WO | 03000389 A2 | 1/2003 | |
| WO | 03013706 A1 | 2/2003 | |
| WO | WO 03024575 A1 | 3/2003 | |
| WO | 03053552 A1 | 7/2003 | |
| WO | 03057632 A1 | 7/2003 | |
| WO | 03059495 A1 | 7/2003 | |
| WO | 03068374 A1 | 8/2003 | |
| WO | 03095078 A1 | 11/2003 | |
| WO | 2004018084 A1 | 3/2004 | |
| WO | 2004024304 A2 | 3/2004 | |
| WO | 2004033078 A1 | 4/2004 | |
| WO | 2004050221 A1 | 6/2004 | |
| WO | 2004056458 A3 | 7/2004 | |
| WO | 2004078327 A1 | 9/2004 | |
| WO | 2004101120 A1 | 11/2004 | |
| WO | 2005005028 A1 | 1/2005 | |
| WO | 2005021140 A1 | 3/2005 | |
| WO | 2005028085 A1 | 3/2005 | |
| WO | 2005028086 A1 | 3/2005 | |
| WO | 2005037414 A1 | 4/2005 | |
| WO | 2005046849 A1 | 5/2005 | |
| WO | 2005077499 A1 | 8/2005 | |
| WO | 2005082498 A1 | 9/2005 | |
| WO | 2005107929 A2 | 11/2005 | |
| WO | 2006026814 A1 | 3/2006 | |
| WO | 2006029456 A1 | 3/2006 | |
| WO | 2006029465 | 3/2006 | |
| WO | 2006047814 A1 | 5/2006 | |
| WO | 2006066350 A1 | 6/2006 | |
| WO | 2007053528 A2 | 5/2007 | |
| WO | 2007065956 A1 | 6/2007 | |
| WO | 2007135087 A1 | 11/2007 | |
| WO | 2008025077 A1 | 3/2008 | |
| WO | 2008034570 A1 | 3/2008 | |
| WO | 2008071516 A1 | 6/2008 | |
| WO | 2008141080 A1 | 11/2008 | |
| WO | 2008153818 A1 | 12/2008 | |
| WO | 2009030405 A1 | 3/2009 | |

OTHER PUBLICATIONS

Anonymous, "Nonwoven Constructions of Dyneon "THV and Dyneon "The Fluorothermoplastics", Research Disclosure Journal, Apr. 1999, RD 420013, 2 pages.

Lloyd, D.R. et al. "Microporous Membrane Formation Via Thermally Induced Phase Separation/Solid-Liquid Phase Separation" Journal of Membrane Science (Sep. 15, 1990), pp. 239-261, vol. 52, No. 3, Elsevier Scientific Publishing Company, Amsterdam, NL.

Mark et al., "Peroxides and Peroxy Compounds, Inorganic" Kirk—Othmer Encyclopedia of Chemical Technology, Peroxides and Peroxy Compounds, Inorganic, to Piping Systems, New York, Wiley & Sons, Ed., Jan. 1, 1978, pp. 14-18.

MicroCTM—Carbon Source for Wastewater Denitrification. Information from Environmental Operating Solutions website including MSDS.

Kaiya et al., "Water Purification Using Hollow Fiber Microfiltration Membranes," 6th World Filtration Congress, Nagoya, 1993, pp. 813-816.

Johnson, "Recent Advances in Microfiltration for Drinking Water Treatment."

Almulla et al., Desalination, 153 (2002), pp. 237-243.

Anonymous, "Nonwoven Constructions of Dyneon "THV and Dyneon" THE Flurothermoplastics", Research Disclosure Journal, Apr. 1999, RD 420013, 2 pages.

Cote et al., Wat. Sci. Tech. 38(4-5) (1998), pp. 437-442.

Cote, et al. "A New Immersed Membrane for Pretreatment to Reverse Osmosis" Desalination 139 (2001) 229-236.

Crawford et al., "Procurement of Membrane Equipment: Differences Between Water Treatment and Membrane Bioreactor (MBR) Applications" (2003).

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Delgrange-Vincent, N. et al., Desalination 131 (2000) 353-362.

Dow Chemicals Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.

Jones, Craig, "Applications of Hydrogen Peroxide and Derivatives," The Royal Society of Chemistry, Cambridge, UK 1999 Chapters 2 and 5.

Kang et al. "Characteristics of microfiltration membranes in a membrane coupled sequencing batch reactor system" Water Research, Elsevier, Amsterdam, NL, vol. 37, No. 5, Mar. 2003.

Lloyd, D. R. et al. "Microporous Membrane Formation Via Thermally Induced Phase Separation/Solid-Liquid Phase Separation" Journal of Membrane Science (Sep. 15, 1990), pp. 239-261, vol. 52, No. 3, Elsevier Scientific Publishing Company, Amsterdam, NL.

Mark et al., "Peroxides and Peroxy Compounds, Inorganic" Kirk-Othmer Encyclopedia of Chemical Technology, Peroxides and Peroxy Compounds, Inorganic, To Piping Systems, New York, Wiley & Sons, Ed., Jan. 1, 1978, pp. 14-18.

Nakayama, "Introduction to Fluid Mechanics," Butterworth-Heinemann, Oxford, UK, 2000.

Ramaswammy S. et al. "Fabrication of Ply (ECTFE) Membranes via thermally induced phase Separation", Journal of Membrane Science, (Dec. 1, 2002), pp. 175-180, vol. 210 No. 1, Scientific Publishing Company, Amsterdam, NL.

Rosenberger et al., Desalination, 151 (2002), pp. 195-200.

U.S. Appl. No. 60/278,007, filed Mar. 23, 2001.

Water Encyclopedia, edited by Jay Lehr, published by John Wiley & Sons, Inc., Hoboken, New Jersey, 2005. Available at http://wwwmmrw.interscience.wiley.com/eow/.

Webster's Ninth New Collegiate Dictionary, Merriam-Webster Inc., Publishers, Springfield, Massachusetts, USA, Copyright 1986, p. 1298.

White et al., The Chemical Engineering Journal, 52 (1993), pp. 73-77.

Wikipedia, "Seawater," available at http://en.wikipedia.org/wiki/Seawater, Jul. 15, 2007.

Yamamoto et al., Water Science Technology, vol. 2, pp. 43-54; 1989.

Yoon: "Important operational parameters of membrane bioreactor-sludge disintegration (MBR-SD) system for zero excess sludge production" Water Research, Elsevier, Amsterdam, NL, vol. 37, No. 8, Apr. 2003.

Coulson et al., "Coulson and Richardson's Chemical Engineering," 1999, vol. 1, pp. 358-364.

Cui et al., "Airlift crossflow membrane filtration—a feasibility study with dextran ultrafiltration," J. Membrane Sci. (1997) vol. 128, pp. 83-91.

Japanese Office Action dated Jan. 4, 2012 for Application No. 2008-294802, 4 pages (translation).

Kaiya et al., "Water Purification Using Hollow Fiber Microfiltration Membranes," 6th World Filtration Congress, Nagoya, 1993, pp. 813-816.

Ueda et al., "Effects of Aeration on Suction Pressure in a Submerged Membrane Bioreactor," *Wat. Res.* vol. 31, No. 3, 1997, pp. 489-494.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

Zenon, "Proposal for ZeeWeed® Membrane Filtration Equipment System for the City of Westminster, Colorado, Proposal No. 479-99," Mar. 2000, entire publication.

Figure 1 Membrane Module Assembly (a) Filtration (b) Air scouring (c) Pressurization via backwash (d) Blow-out and fast drain-down Figure 2 Membrane Cleaning Sequence Figure 3 Cleaning Efficiency of Different Strategies Figure 4 Effect of High velocity Sweep on Membrane Cleaning Figure 5 Alternative Air Injection Figure 6 Effect of Alternative Air Injection on Scrubbing Efficiency

METHOD OF CLEANING MEMBRANE MODULES

FIELD OF THE INVENTION

The present invention relates to membrane filtration systems and, more particularly, to a method and apparatus for improving the filtration efficiency of such systems by providing an improved cleaning system for the membranes.

BACKGROUND ART

Any discussion of the prior art throughout the specification should in no way be considered as an admission that such prior art is widely known or forms part of common general knowledge in the field.

In a membrane filtration process, the method used to physically clean membranes is of vital importance. An efficient membrane cleaning strategy can maintain a stable permeability of the membrane and reduce the frequency of chemical cleans. A commonly used method to physically clean membranes is a backwash (also called "backflush" or "backpulse") with the permeate/filtrate or a gas. The backwash method is typically used to eject solids blocking the membrane pores and partly dislodge the cake that may have formed on the membrane surface.

Backwash with pressurized gas has proved a very efficient cleaning method and is now widely used in the field of microfiltration processes. The limitation to this method is the membrane pore size. Backwash of membranes with permeate has no limitations to the pore size, but the backwash efficiency is generally lower than gas backwash and the transmembrane pressure (TMP) recovery not enough to offset the fouling rate. Further means are employed to enhance the backwash efficiency, such as dosing chemicals to the backwash permeate, or in combination with gas scrubbing.

Maruyama et al in Japanese Patent No. JP2031200 discloses a hollow fibre membrane backwashing method. The method involves the following sequence: stop filtration, air-scour membrane, fill the membrane vessel, backwash with permeate under pressurized air and drain the waste. This procedure is repeated to achieve a higher efficiency. Sunaoka et al in a U.S. Pat. No. 5,209,852 describes a process for scrubbing hollow fibre membranes in modules. This process is composed of a two-stage air scrubbing and draining to clean the membranes.

A lot of effort has been made to more effectively lift solids accumulated on the membrane surface and in the pores by optimising the backwash pressure and enhancing the air scrubbing efficiency. Another important step to achieve an efficient cleaning, which has been largely ignored, is the removal of solids that have been exfoliated off the membrane, from the membrane modules. The typical methods presently used are by draining down of the waste or by feed-and-bleed. Feed and bleed involves continual bleeding of waste containing feed out of the filtration system. The outcome is the accumulation of solids within the modules, particularly towards the two ends of a module and the effect becomes more serious if the membranes are densely packed in a module.

DISCLOSURE OF THE INVENTION

It is an object of the present invention to overcome or at least ameliorate one or more of the disadvantages of the prior art outlined above or at least provide a useful alternative.

According to one aspect, the present invention provides a method of cleaning a membrane filtration module, said module including at least one membrane located in a feed-containing vessel, the membrane having a permeable wall which is subjected to a filtration operation wherein feed containing contaminant matter is applied to one side of the membrane wall and filtrate is withdrawn from the other side of the membrane wall, the method comprising the steps of:

a) suspending the filtration operation;
b) performing a cleaning process on the membrane wall to dislodge contaminant matter therefrom into liquid surrounding the membrane;
c) performing a high velocity sweep of the feed-containing vessel to remove the liquid containing the dislodged contaminant matter; and
d) recommencing the filtration operation.

Preferably, the cleaning process of step b) includes a fluid backwash of the membrane pores. For preference, the fluid backwash includes a liquid and/or gas backwash. For further preference, the cleaning process includes gas scrubbing of the surface of the membrane.

Preferably, the sweep of the feed-containing vessel is performed periodically in different directions within the vessel during operation of the cleaning method.

The contaminant matter may include solids, soluble species or other material removed from the feed during the filtration process.

BRIEF DESCRIPTION OF DRAWINGS

Preferred embodiments and examples of the invention will now be described, by way of example only, with reference to the accompanying drawings in which.

DESCRIPTION OF PREFERRED EMBODIMENTS AND EXAMPLES

In the preferred embodiments, the membrane cleaning regime may include a combination, in part or in whole, depending on the feed water quality, of one or more backwash methods.

A backwash or blowout, or a combination of both, may be used to dislodge the solids blocking the membrane pores.

The backwash is normally achieved by forcing the permeate in a reverse direction to filtration through the membrane pores. The backwash flow rate is usually in a range of 50-500% of the filtration flow, more commonly in a range of 100-300% of the filtration flow.

Blowout is another method of removing solids from the membrane pores by creating a rapid and explosive decompression within the filtration vessel. In this method, the two sides (feed side and permeate side) of a membrane are firstly pressurized to a specific value. Then the discharge valve on the feed side is opened to generate an instantaneous negative transmembrane pressure (TMP). The solids in membrane pores are then blown out by the instantaneous negative TMP. As described below, in one embodiment, the blowout can also be integrated into a high velocity sweep step.

Another method of removing solids build-up from the membrane walls uses gas scouring to exfoliate the membrane surface. This method uses gas bubbles moving past the membrane surface to achieve an efficient scrubbing. Gas scouring is widely used in the membrane filtration processes where suction is applied to the permeate side of the membrane wall to induce filtration. For the pressurized membrane filtration systems, gas scrubbing is achieved by injecting gas, usually air, into the bottom end of the membrane module while the permeate is withdrawn from the upper end, as described in Japanese Patent No. JP2031200 and U.S. Pat. No. 5,209,852.

After the backwash step, the solids removed from the membranes are normally removed from modules by draindown of the waste. The velocity during a normal draindown is limited by the gravity force on the liquid within the vessel. The shear force thus generated is weak and may not be high enough to flush accumulated solids out of the modules and/or strip solids off the surface of the membrane. The situation is more manifest in hollow fibre membrane modules having a high fibre packing density.

Figure 1:
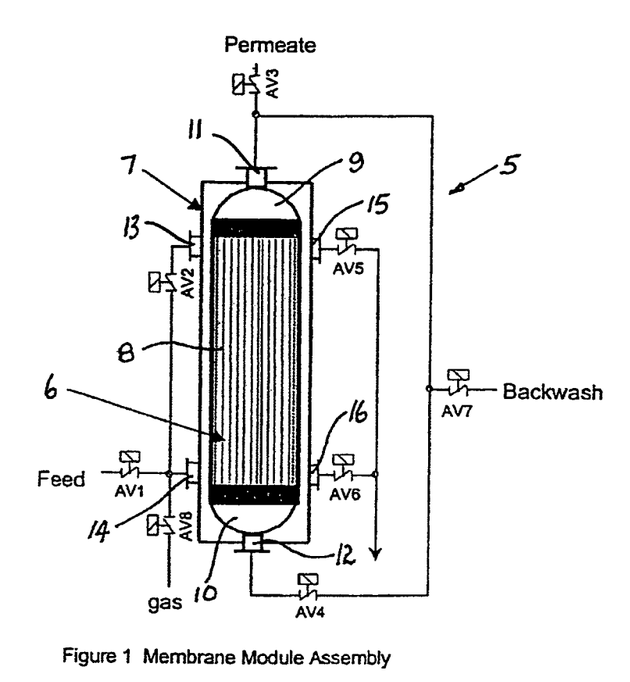
FIG. 1 shows a schematic representation of the membrane module assembly according to one embodiment of the invention.
Figure 2:
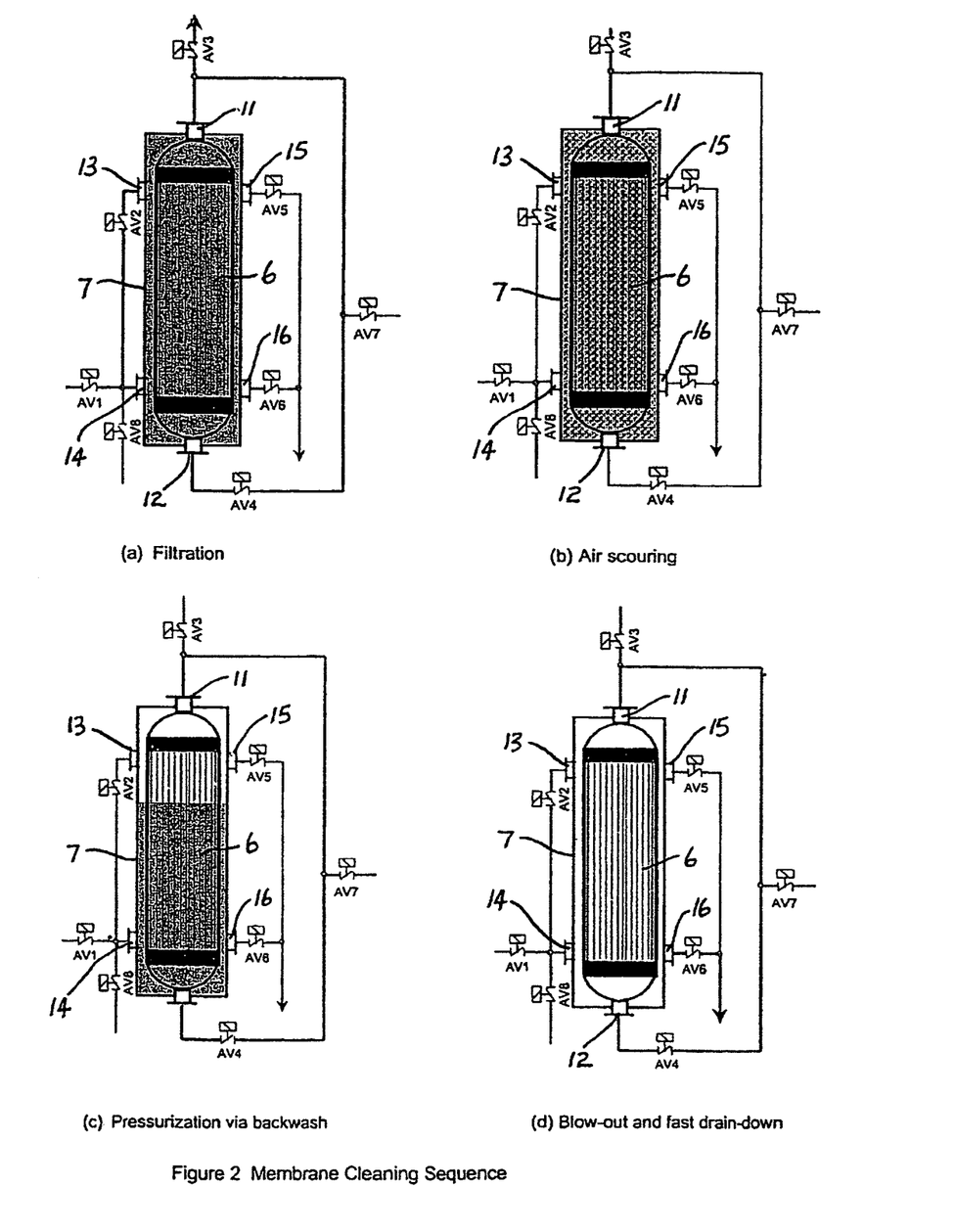
FIGS. 2a to 2d show schematic representations of the membrane module of FIG. 1 during the membrane cleaning sequence according to the invention.

Referring to FIGS. 1 and 2, a preferred embodiment of one form of module cleaning will be described.

FIG. 1 illustrates a membrane module assembly 5. A hollow fibre membrane module 6 is located in a vessel 7. The module 6, in this example, contains a plurality of porous hollow fibre membranes 8, the ends the fibres opening into respective upper and lower permeate collection headers 9 and 10. Filtration takes place by applying feed to the outer wall of the fibres and withdrawing permeate through the fibre lumens. Filtrate/permeate is removed from both ends of the module 6 through ports 11 and 12 connected to headers 9 and 10 respectively. Feed inlet ports 13 and 14 and waste discharge ports 15 and 16 are provided at the upper and lower ends of the vessel 7, respectively. Valves AV1 and AV2 control the flow of feed to ports 13 and 14 while valves AV8 and AV5 control the flow of scouring gas. The flow of filtrate or permeate from the headers 9 and 10 is controlled by valves AV3 and AV4 while backwash flow to these headers is controlled by valves AV7 and AV4. Valves AV5 and AV6 control waste discharge from ports 15 and 16.

The steps of the process will now be described with reference to FIGS. 2a to 2d.

Step 1. Filtration. During a typical dead-end filtration process, valves AV1-4 are open. The raw feed water is fed via valves AV1 and AV2 entering the upper and lower inlet ports 13 and 14 while the permeate is withdrawn from the top and bottom ports 11 and 12 of the module 6 (as best shown in FIG. 2(a)).

Step 2. Air scouring. At the end of the filtration step, valves AV1-4 are closed, and then the upper discharge valve AV5 and the gas inlet valve AV8 are open. Gas (usually air) is then introduced into the module 6 through valve AV8 and the lower port 14 to scour the membrane as illustrated in FIG. 2(b).

Step 3. Pressurization via backwash. When the gas scouring stops, valves AV5 and AV8 are closed. The vessel 7 is left partly filled with gas and water. A permeate backwash is initiated by opening valves AV4 and AV7. The pressure in the vessel 7 gradually increases during the backwash to pressurize the remaining gas within the vessel 7 (see FIG. 2(c)) and finally the pressure on both sides of the membrane walls equalizes. A pressurized gas pocket is thus formed within the vessel 7.

Another way to create such a gas pocket is to drain down or partly drain down the liquid waste at the end of the filtration Step 1 or after the gas scouring in Step 2. In this case it takes longer time to pressurize the gas, and consumes more permeate, but will achieve a higher average sweep velocity. The sweep velocity is desirably greater than 0.03 m/sec and preferably in the range 0.3 m/sec to 2.0 m/sec.

Step 4. Blowout and high velocity sweep down (FIG. 2(d)). When the pressure on the permeate side approaches that on the feed side of the membrane wall, which is also the maximum discharge pressure of the backwash pump, valve AV6 is opened. An instantaneous negative TMP is generated across the membrane wall, which achieves a second backwash of the membrane pores. Simultaneously, the high-pressure gas pocket formed on the feed side rapidly expands and sweeps down the solids out of the membrane module at a high velocity through port 16. The high velocity sweep may also create a high shear force to assist scrubbing the membrane surface. The maximum negative TMP and sweep velocity that can be achieved depend on the resistance in the drain line and the pressure on the permeate side of the membrane. At the end of the fast drain, the backwash pump is stopped and valves AV6 and AV7 are closed. The sequence then returns to the start of filtration.

The process described above generates both a blowout effect and a fast drain-down of the vessel 7. Therefore good cleaning efficiency can be achieved. Other means to achieve a high velocity sweep may include the use of the feed pump to deliver a sweep flow or employing compressed air/gas applied to the vessel housing the module or an external vessel, to achieve a high velocity sweep. An external vessel may be used where formation of a pressurized gas bubble within the feed containing vessel is difficult due to module configuration. In such an arrangement a gas containing region is provided within a further vessel coupled to said feed-containing vessel. The feed-containing vessel and the further vessel are sealed as a whole following said cleaning step and pressure applied to gas within the gas containing region to pressurize said gas, the pressure is then released by opening the feed-containing vessel to atmosphere so as to cause the pressurized gas to expand and produce said high velocity sweep of the feed-containing vessel. An external vessel may also be selectively coupled by a valve to the feed-containing vessel and contain pressurized gas and/or liquid which is released by opening the valve into the feed containing vessel to produce the high velocity sweep.

A further method of achieving a highly efficient sweep is to change the sweep direction (upwards and downwards sweep) from time to time. The times of the sweep in one direction and the frequency of change of the sweep direction depend on the module configuration, feed water quality and the operating conditions of the filtration system.

It will be appreciated that the method of cleaning membranes described above can also be applied to the inside-out filtration process, filtration by suction and other types of membranes, including flat sheet, tubular, spiral wound as well as other configurations.

A number of tests were conducted using different cleaning regimes. These tests are described below.

Example 1

Short Term Tests

A hollow fibre membrane module with a surface area of 33 m² (based on OD) was installed in a process illustrated in FIG. 1. Filtration was conducted by pressurizing the shell side of the module for 10 minutes and at a flux of 52 L/m²/hr. The feed water quality was poor with a turbidity of 35 NTU. At the end of filtration a membrane cleaning procedure was started. The following cleaning strategies were conducted and the cleaning efficiency is compared in FIG. 3.

Strategy 1: Permeate backwash only. The cleaning protocol involved the permeate backwash only at a flow rate of 3.2 m³/hr and a duration of 15 seconds. Solids were removed by pumping the feed water at a flow rate of 3.5 m³/hr from the lower inlet port and sweeping out of the module through valve AV5 for 38 seconds. The TMP kept rising after each backwash, indicating poor backwash efficiency.

Strategy 2: Air scouring and permeate backwash. The cleaning strategy included a pre-aeration for 15 seconds at an air flow rate of 8 m³/hr and then the permeate backwash similar to Strategy 1 plus a continued aeration for 15 seconds. The solids were removed by the normal sweep as in Strategy 1. The TMP dropped after such cleans and a better cleaning efficiency was achieved.

Figure 3:
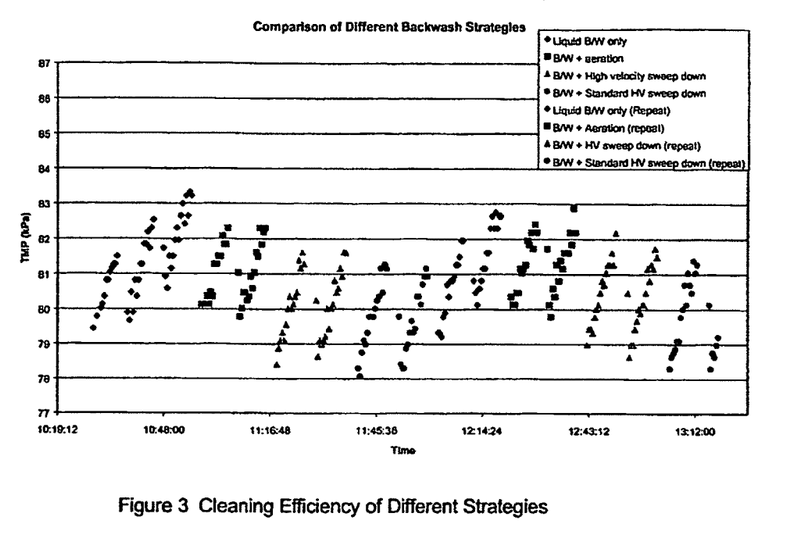
FIG. 3 shows a graph of transmembrane pressure (TMP) versus time for the module of FIG. 1 illustrating cleaning efficiencies of various backwash regimes.

Strategy 3: High velocity sweep down. The sequence was air scouring for 15 seconds, gravity drain down of waste (5 seconds), permeate backwash with the shell side valves closed till the pressure at the permeate side reached 480 kPa (20 seconds), then opening the drain valve to achieve a blow-out and high velocity sweep down (10 seconds). FIG. 3 shows that such a high velocity sweep-down further recovered TMP and removed the foulant on the membranes. The high velocity sweep not only removed accumulated solids from the module, it also provided further scouring of the membrane surfaces.

Strategy 4: Similar to Strategy 3 with a slightly different time scale: gravity drain for 10 seconds, backwash and pressurization for 30 seconds followed by high velocity sweep down for 5 seconds. Similar effect to Strategy 3 was recorded.

The above strategies were repeated and the results illustrated effectiveness of the high velocity sweep down in removing accumulated solids from module.

Example 2

Extended Test on Effect of High Velocity (HV) Sweep

Figure 4:
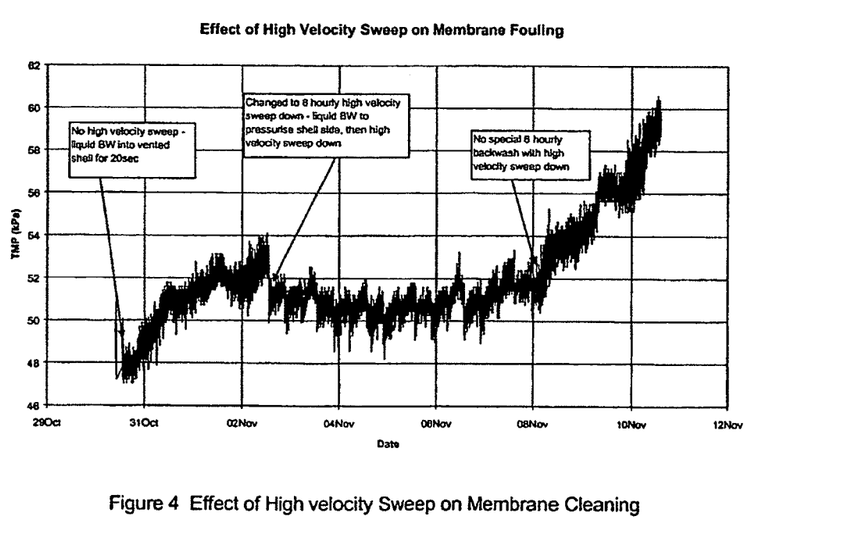
FIG. 4 shows a graph of transmembrane pressure (TMP) versus time for the module of FIG. 1 illustrating the effect of the high velocity sweep on membrane cleaning.

An extended test was conducted in the same pilot machine and on the same site as in Example 1. The strategy combining air scouring and permeate backwash (Strategy 2 in Example 1) was used to clean the membranes. Fouling of the membrane was reflected in the TMP rise during a constant flux operation process. The TMP change profile was recorded on a data logger device and FIG. 4 illustrates the TMP profile. After three days (October 30-November 2) TMP rose by 5.5 kPa. Then the control program was changed to allow one high velocity sweep (Strategy 4 in Example 1) for every eight-hours of operation. The TMP was quite stable during the next six days and only a rise of 1 kPa was recorded. On November 8, the special high velocity sweep was removed and the TMP increased rapidly without the fast sweep. The extended test again illustrated the effectiveness of the high velocity sweep in cleaning of membranes.

A further aspect of the invention relates to an improved gas scouring method where permeate can be withdrawn from both ends of the module. According to this aspect there is provided a method of cleaning a membrane filtration module, said module including at least one elongate membrane positioned in a feed-containing vessel, the membrane having a permeable wall which is subjected to a filtration operation wherein feed containing contaminant matter is applied to one side of the membrane wall and filtrate is withdrawn from the other side of the membrane wall, the method comprising the steps of:

a) suspending the filtration operation;
b) dislodging contaminant matter from said membrane wall into liquid surrounding the membrane by flowing gas bubbles along the one side of the membrane wall, said gas bubbles being formed by feeding gas into said feed-containing vessel through an opening therein.

Preferably, the opening is positioned laterally of the membrane.

In the prior art gas or air was introduced into the modules via the bottom port and the permeate taken from the top end only. The details of such a module configuration are described in U.S. Pat. No. 6,156,200.

Figure 5:
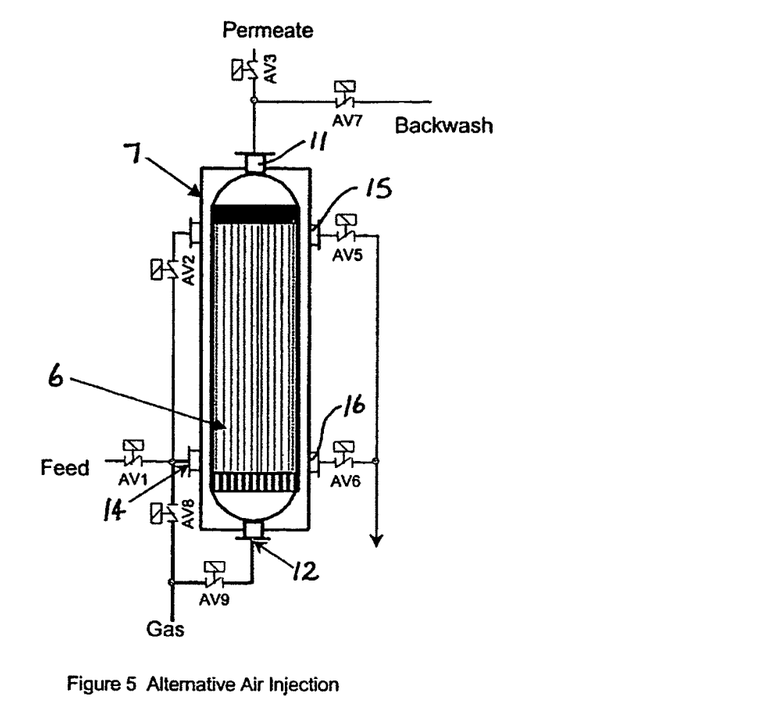
FIG. 5 shows a schematic representation of a membrane module according to a further embodiment of the present invention.

In the above examples 1 and 2, we have shown the introduction of gas into a module when the permeate is withdrawn from both ends. FIG. 5 illustrates the module configuration and the ports for alternative gas injection. In this configuration, port 12 is connected to the gas source via valve AV9 and the backwash line through valve AV4 is removed. Permeate is withdrawn from one end through port 11.

Figure 6:
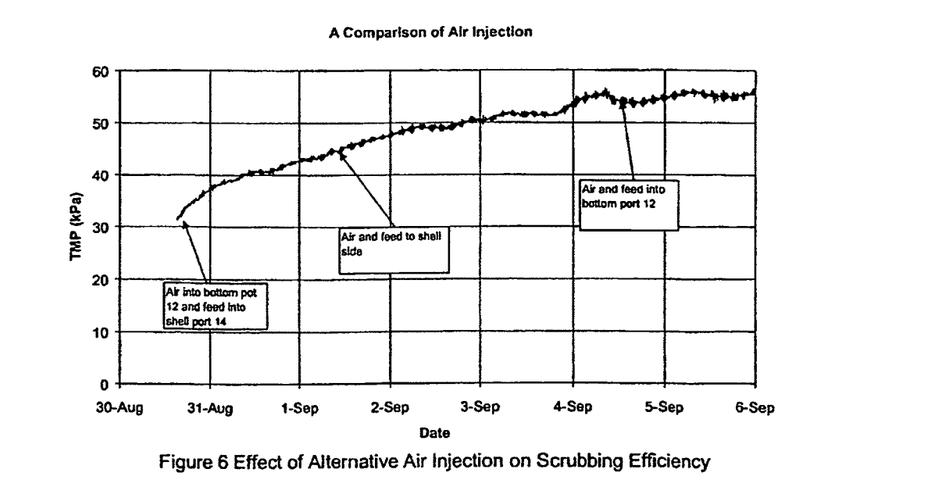
FIG. 6 shows a graph of transmembrane pressure (TMP) versus time for the module of FIG. 5 illustrating the effect of the gas injection on scrubbing efficiency.

There are two choices of introducing gas into the module 7. The first option is to introduce gas into the bottom pot of the module via port 12. Alternatively gas can be injected via shell side feed port 14. This method allows the application of gas scouring to the situation where the permeate is taken from both ends of a module. FIG. 6 compares the TMP profile by changing the injection of gas into port 12 or 14. Under the same operating conditions, injecting gas into a different port did not produce any significant effect on the gas scrubbing efficiency.

It will be appreciated that further embodiments and exemplifications of the invention are possible with departing from the spirit or scope of the invention described.

What is claimed is:

1. A method for cleaning a membrane filtration module, the module comprising at least one membrane located in a feed-containing vessel, the membrane comprising a permeable wall, the method comprising:
   conducting a filtration operation wherein a feed is applied to a first side of the permeable wall and a filtrate is withdrawn from a second side of the permeable wall;
   suspending the filtration operation;
   performing a cleaning process on the permeable wall to dislodge a contaminant therefrom into a liquid surrounding the membrane;
   forming a gas-containing region on the first side of the permeable wall;
   sealing the feed-containing vessel;
   pressurizing a gas within the gas-containing region via a backwash operation;
   opening a lower valve of the feed-containing vessel to atmosphere when a pressure on the first side of the membrane equals a pressure on the second side of the membrane to generate an instantaneous negative trans-membrane pressure, whereby the gas-containing region expands and produces a high velocity sweep of the feed-containing vessel to remove the liquid containing the dislodged contaminant through the lower valve; and suspending the backwash operation when the high velocity sweep of the feed-containing vessel is complete.

2. The method according to claim 1, wherein the step of performing a cleaning process comprises performing a fluid backwash of the permeable wall.

3. The method according to claim 2, wherein the fluid backwash comprises a liquid backwash.

4. The method according to claim 2, wherein the fluid backwash comprises a gas backwash.

5. The method according to claim 1, wherein a velocity of the high velocity sweep is greater than about 0.03 msec.

6. The method according to claim 1, wherein a velocity of the high velocity sweep is from about 0.3 msec to about 2.0 msec.

7. The method according to claim 1, wherein the step of performing a cleaning process comprises gas scrubbing a surface of the permeable wall.

8. The method according to claim 1, wherein the membrane comprises a hollow fiber membrane, and wherein the filtrate is withdrawn from at least one end of the hollow fiber membrane during the filtration operation.

9. The method according to claim 1, wherein the gas-containing region is formed within the feed-containing vessel.

10. The method according to claim 1, wherein the gas-containing region is formed within a further vessel coupled to the feed-containing vessel; and wherein the step of sealing the feed-containing vessel comprises sealing the feed-containing vessel and the further vessel as a whole.

11. The method according to claim 9, wherein the gas-containing region is formed by partially draining down a feed liquid within the feed-containing vessel.

12. The method according to claim 9, wherein opening the feed-containing vessel comprises applying a fluid backwash to the membrane.

13. The method according to claim 1, wherein the cleaning process on the permeable wall is suspended prior to forming a gas-containing region on the first side of the permeable wall.

14. The method according to claim 1, wherein an elapsed time between suspending the filtration operation and suspending the backwash operation is less than 1 minute.

* * * * *